United States Patent [19]

Scheuermann

[11] Patent Number: 5,730,813
[45] Date of Patent: Mar. 24, 1998

[54] PROCESS FOR ANNEALING AN ANNEALING CHARGE AND SUITABLE ANNEALING FURNACE

[75] Inventor: Walter Scheuermann, Bonn, Germany

[73] Assignee: LOI Thermprocess GmbH, Germany

[21] Appl. No.: 637,664

[22] PCT Filed: Dec. 10, 1994

[86] PCT No.: PCT/EP94/03353

§ 371 Date: Apr. 26, 1996

§ 102(e) Date: Apr. 26, 1996

[87] PCT Pub. No.: WO95/11999

PCT Pub. Date: May 4, 1995

[30] Foreign Application Priority Data

Oct. 28, 1993 [DE] Germany ............ 43 36 771.2

[51] Int. Cl.$^6$ .................. C21D 1/76; B01D 46/00
[52] U.S. Cl. .................. 148/633; 266/156; 266/155; 134/22.11; 134/22.12
[58] Field of Search .................. 266/156, 155, 266/157, 252; 148/633; 134/37, 31, 22.11, 22.12

[56] References Cited

U.S. PATENT DOCUMENTS 4,668,253 5/1987 Lonardi et al. ............ 266/157

FOREIGN PATENT DOCUMENTS

| 9237 | 3/1985 | Japan | 266/155 |
| 1099612 | 5/1986 | Japan | 266/156 |
| 0761809 | 10/1980 | U.S.S.R. | 266/155 |

*Primary Examiner*—Deborah Yee
*Attorney, Agent, or Firm*—Blakely Sokoloff Taylor & Zafman

[57] ABSTRACT

Annealing is performed in the annealing chamber (2) of the annealing furnace (1) under a protective gas atmosphere. A partial-stream cleaning device (3) for the protective gas is connected to the annealing chamber. The protective gas can be cooled, the condensate forming from water vapour and rolling oil residues is then separated and/or undesirable gas components are removed by adsorption. Once the cleaning process has been running for so long that the protective gas essentially no longer contains any rolling oil residues, the protective gas may be passed through a hot reaction chamber (4) in which oxygen is removed from it so that the dew point drops and easily oxidised alloying components of the annealing charge are protected against oxidation.

19 Claims, 1 Drawing Sheet

PROCESS FOR ANNEALING AN ANNEALING CHARGE AND SUITABLE ANNEALING FURNACE

The present invention relates to a process for annealing an annealing charge, in particular sheet steel, in an annealing chamber of an annealing furnace under a protective gas atmosphere. Furthermore, the present invention relates to such an annealing furnace.

The surface quality of the treated annealing charge depends among other things on the purity of the protective gas. As the protective gas absorbs impurities during the annealing treatment, it has so far, according to the prior state of the art, been continuously removed and replaced by fresh protective gas. The used protective gas is then disposed of. This causes considerable losses. To keep said losses within limits, the exchange of gas is allowed to take place at a relatively slow rate and a poorer surface quality of the sheet steel is accepted as a consequence.

SUMMARY OF THE INVENTION

The object of the present invention is to provide a remedy and to guarantee high surface quality of the annealing charge whilst reducing the cost of the protective gas.

This object is achieved by the process according to the present invention characterised in that a partial-stream of the protective gas is led out of the annealing chamber of the annealing furnace, subjected to a cleaning treatment and then returned to the annealing chamber.

In this manner, the protective gas can be kept very clean. The throughput of the partial-stream can advantageously be set to many times the free volume of the annealing chamber, preferably to 100 to 300 m³/h, as no protective gas losses are connected therewith. It has been shown that the cleaned protective gas produces, under some circumstances, better surface results than fresh protective gas, in particular if the latter is only available in poor quality.

The protective gas is advantageously cooled, whereupon the condensate forming from water vapour and rolling oil residues, possibly together with contaminating particles, is separated. Evaporation and crack products from the rolling oil residues mean considerable contamination of the protective gas, above all in the heating phase. Thanks to rapid separation of the condensate, together with the removal of any solid particles, a rapid and intensive cleaning of the annealing charge takes place without the impurities remaining in the protective gas for a prolonged period. The protective gas is advantageously cooled to below 100° C., preferably to below 20° C. as the former protects the downstream compressor and the latter additionally facilitates and accelerates the cleaning process.

In a further embodiment of the present invention it is proposed that the protective gas is cooled and is cleaned by adsorption of undesirable gas components, in particular water vapour and methane. Fillers, such as zeolite, are used for adsorption. The protective gas accumulates methane particularly towards the end, above all during the last third, of the annealing process. Thus the methane-related adsorption process becomes effective particularly towards the end of the annealing process. For the cooling temperatures the figures given above apply.

The adsorbent generally requires regeneration which is preferably performed by heating and/or evacuation.

The adsorption process may be performed independently of condensate separation or may be coupled with condensate separation. In the latter case, it is particularly advantageous to have a common cooling step upstream of condensate separation and the adsorption process. This reduces the amount of apparatus required as otherwise two sets of cooling equipment would be necessary.

Furthermore, it is advantageous to use the cooled protective gas without prior heating for cooling the annealing charge. Partial-stream cleaning is therefore integrated at the end of the annealing process into the cooling of the annealing charge which is then taking place.

The adsorption process can accumulate the entire water vapour and rolling oil residues. Its efficiency is comparable with that of a condensate separator which works at −70° C. Therefore a condensate separator can be dispensed with. However, the cost of adsorbent regeneration is then higher. Therefore, it is sensible to couple the condensate separator with the adsorber, the latter serving above all to remove the methane during the last phase of the annealing process, but at the beginning of the heating phase also taking up part of the water vapour.

DETAILED DESCRIPTION OF THE INVENTION

Figure 1:
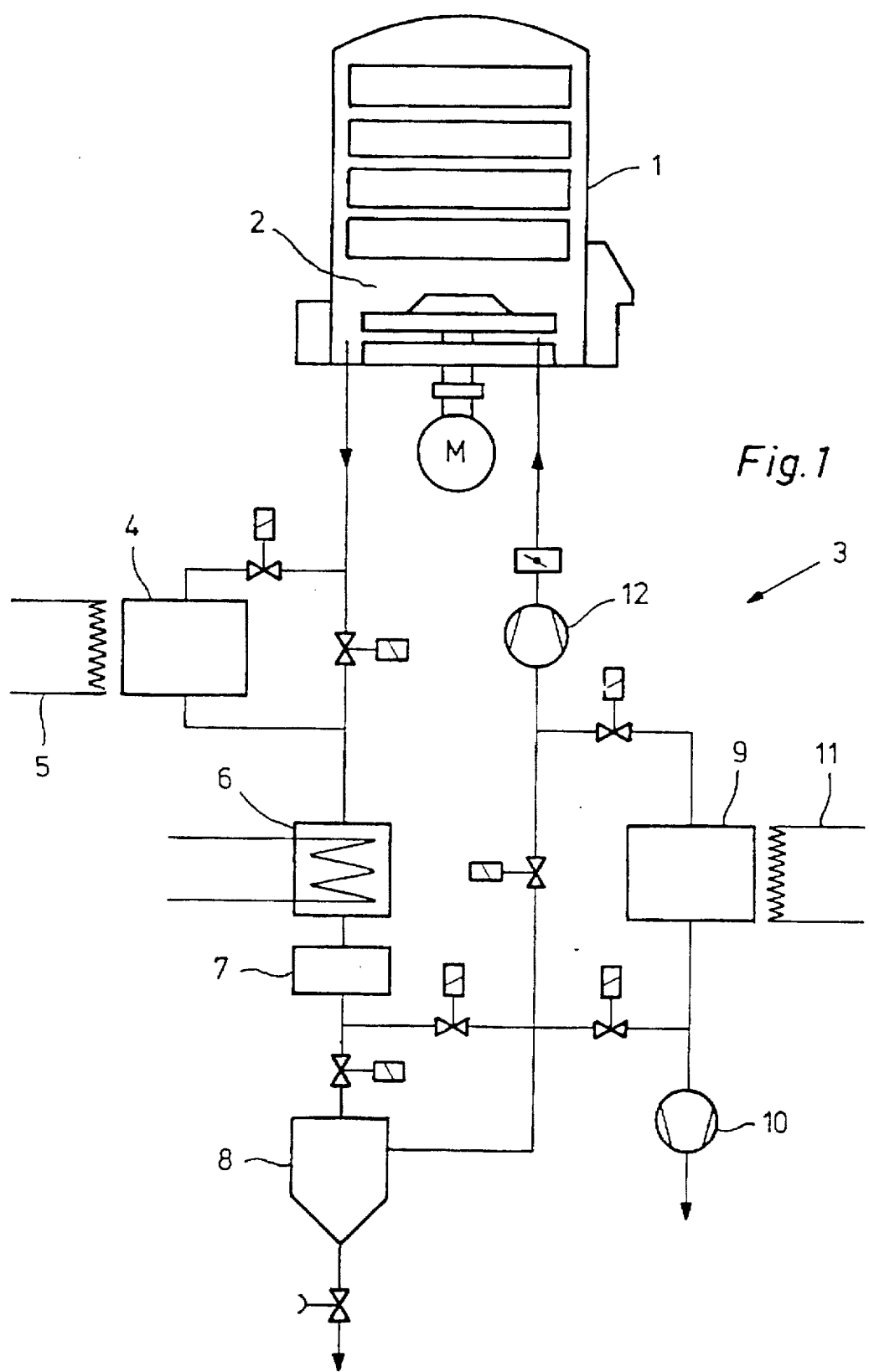
FIG. 1 shows a schematic of an annealing furnace according to the invention.

In a further embodiment of the present invention it is proposed that oxygen is removed from the hot protective gas in a hot reaction zone. Materials which have a higher affinity to oxygen than certain alloying elements of the annealing charge to be protected, above all chromium and manganese, serve as reactants. Through the reaction on metals, preferably magnesium, aluminium, titanium and silicon, the dew point of the protective gas is reduced to such a point that no oxidation of the easily oxidised alloying elements of the annealing charge takes place.

It has been found that the removal of oxygen causes a considerable improvement in the surface quality of the annealing charge. In particular, manganese can cause residues on the material surface, which remain visible even after painting.

Removal of the oxygen is preferably not commenced until the core temperature has reached a value at which the evaporation of the rolling oil residues is substantially completed, preferably 550° to 650° C. According to current knowledge, the optimum temperature is between approx. 580° and 620° C. It is important to keep the rolling oil residues out of the hot reaction zone as the reagents present there will otherwise be contaminated. The reagents then lose their effectiveness and have to be disposed of. As soon as the protective gas is substantially free of rolling oil residues, it only contains a residual amount of water vapour as well.

The core temperature is understood to mean the temperature prevailing at the centre of the coiled annealing charge. It is preferably calculated or determined from the temperature prevailing at the bottom edge of the annealing charge.

The hot reaction zone may be provided with a separate heating device. However, it is more advantageous to use the heated protective gas to heat the hot reaction zone.

The condensate removal process and/or the adsorption process may be carried out independent of oxygen removal. However, when all three processes are used, there is a comprehensive reduction in the components in the protective gas inhibiting the annealing process. The cost of the additional apparatus required is more than compensated for by the saving in protective gas and above all by the higher surface quality of the annealing charge. Depending on quality requirements, one or two of the cleaning steps can be dispensed with.

Furthermore, the present invention provides for an annealing furnace for annealing an annealing charge, in particular sheet steel, in an annealing chamber under a protective gas atmosphere, which is characterised by a partial-stream cleaning device for the protective gas connected to the annealing chamber and comprising the following components either alternatively or in combination:

- a heat exchanger to cool the protective gas, downstream of which a condensate separator and/or a cold reaction chamber is/are arranged for adsorbing undesirable gas components, in particular water vapour and methane,
- a hot reaction chamber for removing oxygen from the protective gas,
- a refrigerant cooler.

With this device it is possible to selectively or jointly reduce the evaporation and crack products of rolling oil residues, oxygen and further hindering gases in the protective gas to such an extent that the surface quality of the annealing charge is in no way impaired. The protective gas is recirculated so that no substantial losses occur. Optionally, the heat exchanger may be used for cooling the annealing charge at the end of the annealing treatment.

The cold reaction chamber is preferably provided, for regeneration purposes, with a heating device and/or a vacuum pump.

A refrigerant cooler is advantageously arranged downstream of the heat exchanger to reduce the protective gas temperature further and thus promote the separation process.

Furthermore, it is advantageous to provide the hot reaction chamber with an additional heating device if the protective gas is not sufficient alone to heat said reaction chamber sufficiently quickly and to a sufficient temperature and to keep said reaction chamber at said temperature.

Combinations of the inventive features which deviate from the combinations discussed hereinabove are deemed to have been disclosed as essential to the present invention.

The present invention will now be explained in greater detail below with the aid of a preferred embodiment and the attached drawing. The drawing shows a schematic of an annealing furnace according to the present invention.

The annealing furnace 1 has an annealing chamber 2 working under a protective gas atmosphere, said annealing chamber 2 being connected to a partial-stream cleaning device 3. Said partial-stream cleaning device 3 comprises a hot reaction chamber 4 containing the materials which have a higher affinity to oxygen than certain alloying elements of the annealing charge to be protected, such as chrome and manganese. The materials contained in the reaction chamber 4 are preferably metals such as magnesium, aluminium, titanium or silicon. These materials react with the oxygen in the protective gas, reducing its dew point to such an extent that oxidation of the easily oxidised components of the annealing charge longer takes place to any hindering extent. The reaction chamber 4 is heated using the hot protective gas. Furthermore, it may be provided with an additional heating device 5.

The partial-stream cleaning device 3 furthermore exhibits a gas-water heat exchanger 6, downstream of which is installed a refrigerant cooler 7 preferably operated with liquid $N_2$. Both devices together cool the protective gas to below 20° C. Then the evaporation and crack products from the rolling oil residues and the condensed water can be separated in a condensate separator 8, e.g. in a cyclone.

These impurities can therefore no longer impair the surface quality of the annealing charge.

Part of the partial-stream cleaning device 3 is also a cold reaction chamber 9 which contains an adsorbent, in particular zeolite, for gases which disturb the annealing process, such as water vapour or methane. Said gases attach to the zeolite, thus leading to a further improvement in the surface quality of the annealing charge. In order to regenerate the zeolite, the reaction chamber 9 can be evacuated via a corresponding vacuum pump 10. Furthermore, it is possible to achieve regeneration by heating the reaction chamber 9. A heating device 11 is provided for this purpose.

A compressor 12 returns the cleaned protective gas at the necessary pressure to the annealing chamber 2 of the annealing furnace 1.

As shown in the drawing, a comprehensive system of solenoid valves not described individually in more detail is provided to control the partial-stream cleaning device in accordance with the prevailing operating conditions.

During the heating phase of the annealing charge the reaction chamber 4 is bypassed so that no contamination occurs through the evaporation and crack products from the rolling oil residues, and oxygen from the water vapour does not cause too rapid a consumption of the reagents. Separation takes place in the condensate separator 8. This is performed in the initial phase of the annealing process. At the beginning of the heating period, the cold reaction chamber 9 is also pressurised with water vapour and oil vapours.

As soon as the rolling oil residues and the water vapour have essentially been removed, the hot reaction chamber 4 can also come on stream. However, its operation presupposes in the present case that the core temperature is at least approx. 550° C. Should this not be the case or should the heat supplied by the protective gas for the operation of the hot reaction chamber 4 not be sufficient, the heat deficit can be made up by the additional heating device 5.

The protective gas accumulates methane particularly during the last third of the annealing process. This is adsorbed in the cold reaction chamber 9. During the preceding middle phase of the annealing process the cold reaction chamber 9 may therefore be optionally bypassed. This time can be used for regenerating the adsorbent, either by means of the vacuum pump 10 or by means of the heating device 11.

The system of solenoid valves may further serve to completely shut off individual cleaning devices if less stringent demands on the surface quality of the annealing charge permit such action. For example, the cold reaction chamber can be dispensed with. The protective gas then flows from the condensate separator 8 direct to the compressor 12. In the same manner, only the cold reaction chamber 9 or the condensate separator 8 can be switched on, although the switching-on of the hot reaction chamber 4 brings considerable advantages.

Variations are perfectly possible within the scope of the present invention. For example, the refrigerant cooler 7 can be dispensed with; however, the temperature of the protective gas will then not fall below 20° C. As soon as it has been established that not all assemblies of the partial-stream cleaning device are necessary, the plant can be scaled down to those assemblies which are to be used. In any case, the compressor, the condensate separator and the heat exchanger are required.

I claim:

1. Process for annealing an annealing charge in an annealing chamber having an annealing furnace (1) under a protective gas atmosphere, a partial stream of the protective gas being passed out of the annealing chamber (2) of the annealing furnace, subjected to a cleaning treatment and then returned to the annealing chamber, the process comprising:

removing oxygen from the hot protective gas during the cleaning treatment by reactants in a hot reaction zone, wherein magnesium, aluminium, titanium or silicon, which have a higher affinity to oxygen than certain alloying elements of the annealing charge to be protected; serve as reactants, wherein removal of the oxygen is commenced when the core temperature of the annealing charge has reached a value at which the evaporation of the rolling oil residues is essentially complete, and wherein the rolling oil residues are kept away from the hot reaction zone.

2. Process according to claim 1, wherein the removal of the oxygen is commenced when the core temperature has reached a value of 550° to 650° C.

3. Process according to claim 1 or 2, wherein the core temperature is calculated or determined from the temperature prevailing at the bottom edge of the annealing charge.

4. Process of claims 1 or 2, wherein the hot reaction zone (4) is heated by the hot protective gas.

5. Process of claims 1 or 2, wherein the throughput of the partial stream is 100 to 300 m³/h.

6. Process of claims 1 or 2, wherein the protective gas is cooled and the condensate forming from water vapor and rolling oil residues, possibly together with contaminating particles, is separated.

7. Process of claims 1 or 2, wherein the protective gas is cooled and cleaned by adsorption of undesirable gas components.

8. Process of claim 7, wherein the adsorbent is regenerated by one of heating and evacuation.

9. Process of claim 6, wherein the protective gas is cooled to below 100° C.

10. Process of claim 6, wherein a common cooling step is provided upstream of the condensation separation and the adsorption process.

11. Process of claim 6, wherein the cooled protective gas is used without preheating to cool the annealing charge.

12. Annealing furnace for annealing an annealing charge in an annealing chamber under a protective gas atmosphere, with a partial-stream cleaning device for the protective gas connected to the annealing chamber for performing the process of claim 1, wherein a hot reaction chamber can be switched on in bypass to remove oxygen from the protective gas by reactants, the reaction chamber containing magnesium, aluminium, titanium or silicon which have a higher affinity to oxygen than certain alloying elements of the annealing charge to be protected.

13. Annealing furnace of claim 12, wherein the hot reaction chamber is provided with an additional heating device.

14. Annealing furnace of claim 12, further comprising a heat exchange for cooling the protective gas, downstream of which one of a condensate separator and a cold reaction chamber are arranged for absorbing undesirable gas components, in particular water vapor and methane.

15. Annealing furnace of claim 14, wherein the cold reaction chamber is provided, for regeneration purposes, with one of a heating device and a vacuum pump.

16. Annealing furnace of claim 14, wherein a refrigeration cooler is arranged downstream of the heat exchanger.

17. Process of claim 7, wherein the adsorbent is regenerated by heating and evacuation.

18. Annealing furnace of claim 12, wherein the partial-stream cleaning device includes a heat exchanger for cooling the protective gas, and a condensate separator and a cold reaction chamber coupled downstream of the heat exchanger and arranged for absorbing undesirable gas components.

19. Annealing furnace of claim 14, wherein the cold reaction chamber is provided with a heating device and a vacuum pump.

* * * * *